May 8, 1956
J. F. HALLER
2,744,811
PROCESS
Filed June 24, 1953
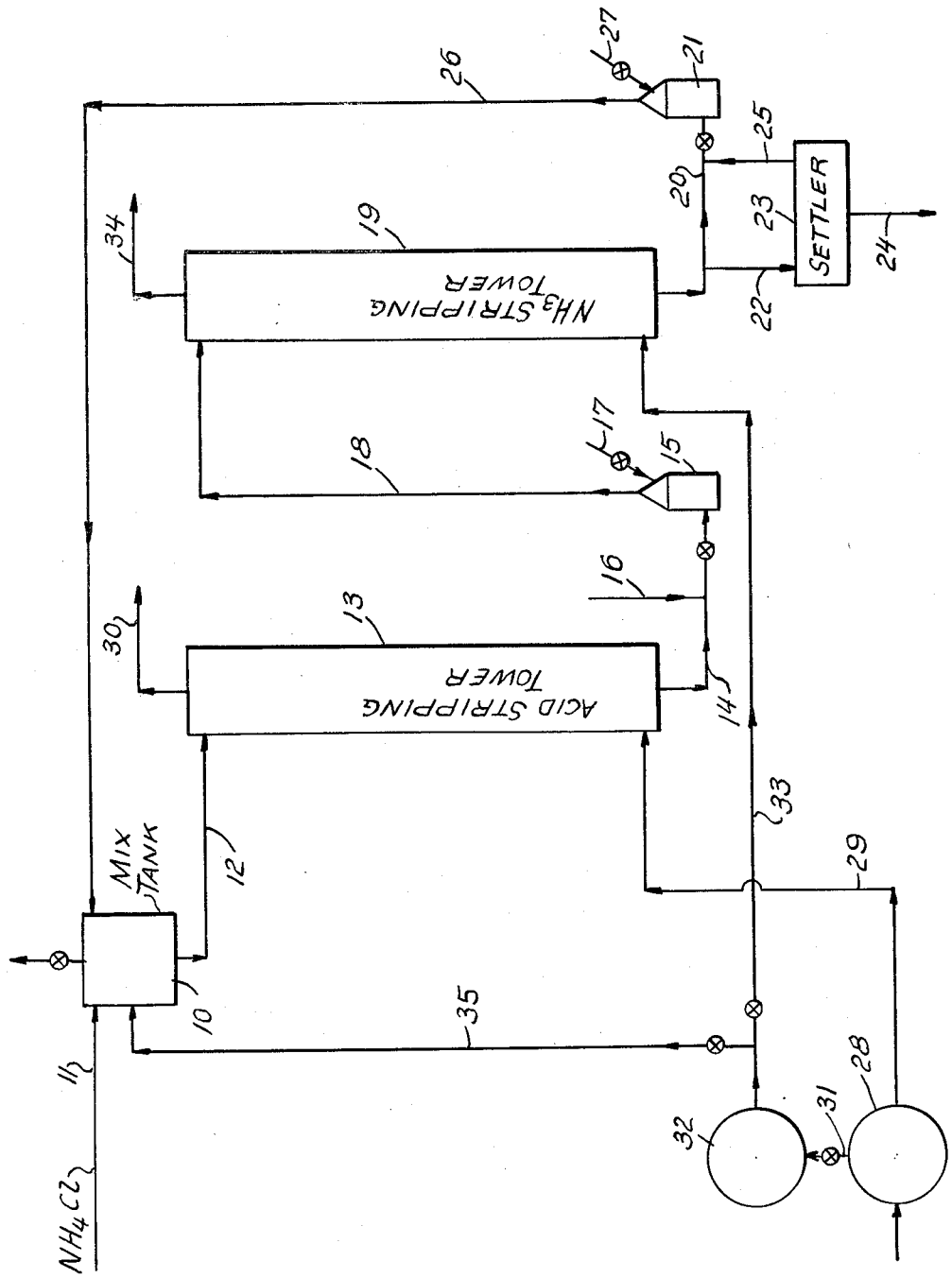
INVENTOR
JOHN F. HALLER
BY
ATTORNEYS

United States Patent Office 2,744,811
Patented May 8, 1956

2,744,811
PROCESS

John F. Haller, Niagara Falls, N. Y., assignor to Olin Mathieson Chemical Corporation, a corporation of Virginia Application June 24, 1953, Serial No. 363,760

8 Claims. (Cl. 23—154)

My invention relates to a process for eliminating the effect of troublesome metal impurities, especially iron, from circulating hot bisulfate melts, more particularly, from a circulating bisulfate melt as employed for the separation of ammonium chloride into recoverable ammonia and hydrogen chloride.

The separation of ammonia and hydrogen chloride from ammonium chloride may be effected by circulating a melt of a bisulfate to which ammonium chloride is added between separate stripping stages from which hydrogen chloride and ammonia are successively removed. The circulating melt permits a staged heating and stripping process which facilitates separation of hydrogen chloride and ammonia in satisfactory purity. The cyclic nature of the process permits high yields based on the ammonium chloride charged under controlled conditions for ammonium chloride concentrations in the circulating melt, residual ammonium chloride for recycle and stripping temperature. For example, a melt of a solid alkali metal or ammonium bisulfate containing about 0.15 to 0.75 mole of ammonium chloride per mole of bisulfate is circulated from a mixing zone through a hydrogen chloride stripping zone and then through an ammonia stripping zone. Ammonium chloride is added to the melt in the mixing zone in a quantity maintaining the desired operating concentration. The ammonium chloride containing melt is transferred to a hydrogen chloride stripping zone, advantageously in the form of a stripping tower to which the melt is charged. A stripping temperature of about 220° to 270° C. is advantageously maintained in the hydrogen chloride stripping zone. A vapor overhead stream and the partially stripped melt are separately removed from the hydrogen chloride zone. The partially stripped melt is passed to an ammonia stripping zone where a stripping temperature of about 330° to 380° C. is advantageously maintained in the ammonia stripping zone. The stripped melt and a vapor stream are separately removed from the ammonia stripping zone. The stripped melt containing residual recycle ammonium chloride is returned to the mixing zone, hydrogen chloride is recovered from the vapor stream removed from the hydrogen chloride stripping zone and ammonia is recovered from the vapor stream removed from the ammonia stripping zone.

Substantial advantages, from the practical standpoint, are obtained by employing an inert thermally stable fluid organic medium such as trichlorobenzene in the circulating melt system. Advantageously, the organic medium, as is the case with trichlorobenzene, is normally liquid but is vaporized under the stripping temperatures of the process since it then can be injected as a vapor or a superheated vapor stream which can be readily separated from the product streams by condensation. The organic fluid performs several important functions in the operation of the system. Since it can be readily heated to high temperatures in a conventional boiler, it provides a convenient means for introducing heat into the system by direct transfer. The presence of the organic vapors in the hydrochloride and ammonia stripping zones and particularly the latter operates to improve stripping efficiency to an important degree. Moreover, the ammonium chloride feed, which as a sublimable solid is at best difficult to handle under the operating conditions, can be slurried in organic liquid recovered by condensation in the product separation zones for recycle and may in this manner be conveniently introduced to the system. Also since it is advantageous to stage the introduction of the organic heat transfer medium to the system, the organic vapors can be utilized in place of pumps as means for lifting the inorganic melt from lower to upper portions of the stripping towers from the make-up tanks and the like.

Although the hot bisulfate melt, plus ammonium chloride, is a clear fluid which can be circulated readily through the lines and stripping towers of the system, the inherent corrosive nature of the melt components cause serious handling problems in practice. For example, in the operation of the process, unexpected shut downs have occurred after a number of cycles because of flooding in the ammonia stripping tower. I have found that troublesome gelatinous and gummy precipitates, accompanied by a serious volume increase, are produced by the presence of small amounts of iron or other metallic impurities in the melt. A portion of the iron apparently enters the system as an impurity in the reactant materials and in the bisulfate melt, but it is probable that the larger proportion is derived from erosion and corrosion of the equipment in which the process is carried out. The problem of iron pick-up is accentuated with the use of an organic heat transfer medium such as trichlorobenzene. Indeed, the problem of iron contamination and the attendant problems of equipment clogging and flow stoppage are such on a commercial scale even utilizing corrosion resistant equipment that continuous operation becomes impractical.

I have found, however, that the addition of a phosphate to the melt composition which is circulated in the continuous system is effective in eliminating the difficulties produced by the presence of metallic impurities. I have found that the metallic impurities, particularly iron, are precipitated in the presence of phosphates in the form of crystalline solids which can be tolerated in the normal flow of the melt through the towers, pumps and fittings of the system, or alternately can be removed from the melt by filtering or settling. Thus according to my invention, a soluble inorganic phosphate or source thereof is added to the circulating bisulfate melt at any convenient point in the system. The amount of phosphate added is such as to maintain a concentration in the range of about 0.1 to 10 per cent by weight, preferably from about 1.5 to 3 per cent on the circulating bisulfate melt, depending on the proportion of iron and other metallic impurity present and its rate of accumulation. The crystalline material precipitated circulates freely through the system. Advantageously, however, a side stream is withdrawn from the circulating bisulfate melt and passed to a settler, or through a filter, where the crystalline precipitate is removed prior to return of the side stream to the circulating melt. During the settling operation, the temperature of the side stream must of course be maintained above the melting point of the bisulfate.

Various sources of phosphate may be used to supply this component to the melt. Examples include ammonium dihydrogen phosphate, diammonium hydrogen phosphate, phosphoric acid, disodium hydrogen phosphate and sodium pyrophosphate. Since satisfactory operation of the circulating melt system, however, can be obtained only by careful control of the composition of the melt, the phosphate source is important. For example, the proportion of ammonium chloride in the melt circulated through the stripping stages should approximate about 0.15 to 0.50 mole of ammonium chloride per mole of bisulfate and advantageously about 0.30 to 0.35:1 mole.

Consequently, the sodium to sulfate ratio in the bisulfate melt is also important, especially where crude ammonium chloride is charged to the system, since it contains sodium chloride. Thus the preferred source of phosphate is phosphoric acid or the ammonium phosphates since they least affect the melt composition. The proportion of added phosphate is small, however, and with proper control of the composition of the melt, any source of phosphate may be used.

Phosphoric acid preferably is added as a liquid to the melt at the base of either of the stripping towers. Monoammonium phosphate may be added with the ammonium chloride feed to the system. Since the melt is continuously recycled, however, addition may be made at any convenient point in the system. The addition may be intermittent or continuous according to convenience, but advantageously a safe concentration of residual phosphate is maintained continuously by control of the magnitude and/or period of addition.

Small amounts of aluminum and titanium may be leached from acid brick and ceramic rings forming a part of the processing equipment and other metals including nickel, manganese and cobalt may be present in trace amounts. The phosphate ion addition will remove any of these minor contaminants of the melt as well as iron.

My invention will be further described by reference to the accompanying drawing of which Figure 1 is a simplified schematic flow plan of the process system.

In Figure 1 solid ammonium chloride is mixed with a molten bisulfate, e. g. sodium bisulfate, in mix tank 10. The ammonium chloride may be added by means of a hopper and seal arrangement (not shown) and line 11 or by means of a screw conveyor. As indicated in the drawing, the mixture flows by gravity through line 12 from mix tank 10 to the top of the hydrogen chloride stripping tower 13. The partially stripped melt from the hydrogen chloride stripping tower flows through line 14 to blow case 15. Liquid phosphoric acid is introduced into line 14 through line 16. By means of the gas or vapor injected into blow case 15 through connection 17, the partially stripped melt is lifted through line 18 to the top of the ammonia stripping tower 19. The stripped melt from the ammonia stripping tower 19 flows through line 20 to blow case 21. A sidestream is withdrawn from line 20 through line 22 and a portion of the melt is passed to settler 23 where the crystalline precipitate settles and is withdrawn through line 24. The sidestream is returned from settler 23 to line 20 through line 25. From blow case 21, the stripped melt is lifted through line 26 back to the mix tank 10 by means of a gas or vapor injected into blow case 21 through line 27.

Heat may be supplied to the system at several points. As indicated in the drawing, an inert gas is heated in heater 28 and is introduced through line 29 to the bottom of the hydrogen chloride stripping tower 13. The hot gas supplies heat for the stripping tower and assists in removing hydrogen chloride from the descending melt by countercurrent contact. A mixture of hydrogen chloride and the stripping gas is removed from the top of hydrogen chloride stripping tower through line 30. Hydrogen chloride is recovered from the mixture in a separate product recovery system and the separated inert gaseous medium may be recovered for return to the heating system. A portion of the gas stream heated in heater 28 advantageously is passed through connection 31 to superheater 32 where additional heat is obtained for conducting the higher temperature ammonia stripping operation. The superheated gas stream is conducted through line 33 to the bottom of the ammonia stripping tower 19 where it maintains the stripping temperature and assists by countercurrent contact in removing ammonia from the melt descending through tower 19. A mixture of ammonia and the stripping gas is removed to a separate product recovery zone through line 34 for recovery of ammonia and, if desired, for recovery of the heating and stripping gas as in the case of the hydrogen chloride section. A portion of the superheated gas stream from superheater 32 may be added by means of line 35 to the melt in the mix tank 10 in order to maintain a high enough melt temperature for good fluidity in the hydrogen chloride stripping tower 13.

It is desirable to employ a substantial excess of the phosphate to precipitate the metal contaminants effectively. For example, with a typical melt containing about 75 per cent of sodium bisulfate and 25 per cent of ammonium bisulfate to which was added 0.1 per cent of iron at about 250° C. precipitation began after 12 to 15 hours when the proportion of phosphoric acid was four times the theoretical requirement to convert the contained iron to phosphate. With eight times the theoretical requirement of phosphoric acid, precipitation began in 6 hours at the same temperature. With a ratio of 18:1, corresponding to about 3 per cent by weight of phosphoric acid, immediate precipitation was produced. By further example, the iron content was reduced to 0.01 per cent after 12 hours and to 0.002 per cent after 40 hours in a mixture containing 3 per cent of phosphoric acid.

Ammonium dihydrogen phosphate ($NH_4H_2PO_4$), disodium hydrogen phosphate ($Na_2HPO_4$), and tetrasodium pyrophosphate ($Na_4P_2O_7$), give similar results.

In an example illustrating operation of the process, a circulating melt in the absence of phosphate addition had developed an iron content of about .05 per cent. During a shut-down, 3 per cent weight of phosphoric acid was added and the melt was agitated to precipitate the iron from solution before circulation was again begun. During three weeks' continuous operation, the phosphate content of the melt gradually decreased to about 1.5 per cent while the iron content of the melt at the base of the ammonia stripping tower varied from 0.002 to 0.006 per cent. At this time the plant was shut down for revision but no trouble had been encountered due to clogging of the equipment. Inspection of the ammonia stripping column showed that the rings, grids and side of the tower were free of adherent material and that the difficulty previously encountered with deposition of gummy material had been completely avoided.

I claim:

1. In a cyclic process for separating ammonia and hydrogen chloride from ammonium chloride which includes circulating a melt of a bisulfate containing ammonium chloride successively through a hydrogen chloride stripping zone and an ammonia stripping zone, recovering hydrogen chloride from a vapor stream removed from the hydrogen chloride stripping zone, recovering ammonia from a vapor stream removed from the ammonia stripping zone, and returning the stripped melt to the stripping zone, the improvement which comprises adding to the circulating melt a material which yields phosphate ions in the melt selected from the group consisting of phosphoric acid and soluble inorganic phosphates in an amount sufficient to precipitate metallic impurities present in the melt as phosphates.

2. In a cyclic process for separating ammonia and hydrogen chloride from ammonium chloride which includes circulating a melt of a bisulfate containing ammonium chloride successively through a hydrogen chloride stripping zone and an ammonia stripping zone, recovering hydrogen chloride from a vapor stream removed from the hydrogen chloride stripping zone, recovering ammonia from a vapor stream removed from the ammonia stripping zone, and returning the stripped melt to the stripping zone, the improvement which comprises adding to the circulating melt a material which yields phosphate ions in the melt selected from the group consisting of phosphoric acid and soluble inorganic phosphates in amounts sufficient to precipitate metallic materials present in the melt as phosphates and maintain in the circulating melt a residual phosphate concentration in an amount in excess of about 0.1 per cent by weight on the circulating bisulfate melt.

3. A cyclic process for separating ammonia and hydrogen chloride from ammonium chloride which comprises circulating a melt of a bisulfate containing 0.15 to 0.75 mole of ammonium chloride per mole of bisulfate successively through a hydrogen chloride stripping zone and an ammonia stripping zone, maintaining a stripping temperature of about 220° to 270° C. in the hydrogen chloride stripping zone, maintaining a stripping temperature of about 330° to 380° C. in the ammonia stripping zone, recovering hydrogen chloride from the vapor stream removed from the hydrogen chloride stripping zone, recovering ammonia from the vapor stream removed from the ammonia stripping zone, adding to the circulating melt a material which yields phosphate ions in the melt selected from the group consisting of phosphoric acid and soluble inorganic phosphates in amounts sufficient to precipitate metallic materials present in the melt as phosphates and maintain in the circulating melt a residual phosphate concentration in an amount in excess of about 0.1 per cent by weight on the circulating melt, and removing precipitated metal phosphates from the circulating melt.

4. The process of claim 3 in which the material which yields phosphate ions is phosphoric acid.

5. The process of claim 3 in which the soluble inorganic phosphate is ammonium dihydrogen phosphate.

6. The process of claim 3 in which the soluble inorganic phosphate is diammonium hydrogen phosphate.

7. The process of claim 3 in which the soluble inorganic phosphate is disodium hydrogen phosphate.

8. The process of claim 3 in which the soluble inorganic phosphate is sodium pyrophosphate.

References Cited in the file of this patent

UNITED STATES PATENTS

| 379,488 | Mond | Mar. 13, 1888 |
| 1,718,420 | Kessler | June 25, 1929 |
| 1,892,652 | Heath | Dec. 27, 1932 |